United States Patent [19]

Menon et al.

[11] Patent Number: 6,090,439
[45] Date of Patent: Jul. 18, 2000

[54] METHOD OF PREPARING TREATED SILICA

[75] Inventors: Vinayan C. Menon, Albuquerque;
Joanne Paul, Rio Rancho; Douglas M. Smith, Albuquerque, all of N. Mex.;
Kenneth C. Koehlert, Champaign, Ill.

[73] Assignee: Cabot Corporation, Boston, Mass.

[21] Appl. No.: 09/229,275

[22] Filed: Jan. 13, 1999

Related U.S. Application Data

[60] Provisional application No. 60/071,560, Jan. 15, 1998.

[51] Int. Cl.⁷ ....................................................... B05D 7/00
[52] U.S. Cl. ........................... 427/215; 427/213; 427/220; 427/221
[58] Field of Search .................................... 427/213, 215, 427/220, 221

[56] References Cited

U.S. PATENT DOCUMENTS

| | | |
|---|---|---|
| 2,589,705 | 3/1952 | Kistler . |
| 2,739,075 | 3/1956 | Iler . |
| 2,786,042 | 3/1957 | Iler . |
| 2,802,850 | 8/1957 | Wetzel . |
| 3,015,645 | 1/1962 | Tyler . |
| 3,122,520 | 2/1964 | Lentz . |
| 3,652,214 | 3/1972 | Aboutboul et al. . |
| 3,924,029 | 12/1975 | Schutte et al. ............................ 427/213 |
| 4,015,031 | 3/1977 | Reinhardt et al. ....................... 427/213 |
| 4,072,796 | 2/1978 | Reinhardt et al. ....................... 427/221 |
| 4,116,919 | 9/1978 | Elias et al. . |
| 4,208,316 | 6/1980 | Nauroth et al. . |
| 4,344,800 | 8/1982 | Lutz . |
| 4,388,449 | 6/1983 | Bonnet et al. . |
| 4,644,077 | 2/1987 | Gupta . |
| 4,671,973 | 6/1987 | Tarbell et al. ........................... 427/221 |
| 4,738,839 | 4/1988 | Schönfeld . |
| 5,008,305 | 4/1991 | Kennan et al. . |
| 5,013,585 | 5/1991 | Shimizu . |
| 5,270,027 | 12/1993 | Balducci et al. . |
| 5,342,597 | 8/1994 | Tunison, III . |
| 5,652,017 | 7/1997 | Osaheni et al. ......................... 427/212 |
| 5,680,713 | 10/1997 | Forbert et al. . |
| 5,708,069 | 1/1998 | Burns et al. ............................. 427/220 |
| 5,908,660 | 6/1999 | Griffith et al. .......................... 427/220 |

FOREIGN PATENT DOCUMENTS

| | | |
|---|---|---|
| 0 372 251 | 6/1990 | European Pat. Off. . |
| 2 065 572 | 7/1974 | Germany . |
| 35 25 802 | 1/1987 | Germany . |
| 35 43 172 | 6/1987 | Germany . |
| 44 19 234 | 12/1995 | Germany . |
| 1062599 | 3/1967 | United Kingdom . |
| 1110331 | 4/1968 | United Kingdom . |
| 98/45210 | 10/1998 | WIPO . |

OTHER PUBLICATIONS

Yamaguchi et al., *Chemical Abstracts*, 107(18), abstract. No. 157559 (Nov. 2, 1987).

Heley et al., *Journal of Non–Crystalline Solids*, 186, 30–36 (1995).

Herrmann et al., *Journal of Non–Crystalline Solids*, 186, 380–387 (1995).

Lutz et al., *Rubber Chemistry and Technology*, 38, 939–952 (1985).

Polmanteer et al., *Rubber Chemistry and Technology*, 48, 795–808 (1975).

*Primary Examiner*—Timothy Meeks
*Assistant Examiner*—Paul D. Strain

[57] ABSTRACT

A method of preparing treated silica is described. The method comprises mixing a hydrolyzable silica precursor such as methyltrichlorosilane with water, an acid (e.g., hydrochloric acid) and a hydrophobing agent capable of rendering polar silanol groups hydrophobic, such as trimethylchlorosilane. The treated silica is then recovered from the mixture.

The inventive method provides a number of mechanisms for controlling the physical properties (e.g., particle size, surface area, etc.) of the treated silica. For example, the rate of hydrolysis of the silica precursor, which impacts these physical properties, can be regulated by the nature and concentration of the acid used in the reaction.

21 Claims, No Drawings

METHOD OF PREPARING TREATED SILICA

This patent application claims the benefit of U.S. Provisional Patent Application No. 60/071,560, filed Jan. 15, 1998.

TECHNICAL FIELD OF THE INVENTION

The present invention relates to a method of preparing treated silica.

BACKGROUND OF THE INVENTION

Amorphous silica particles have a variety of uses. For example, they can be used as fluid thickeners, thermal insulation, anti-caking agents, molecular sieve materials, and reinforcing fillers for silicone and rubber. These diverse uses often demand diverse physical properties of the silica, such as pore size, pore size distribution, particle size, surface area, density, surface properties, and the like.

For example, it is known that when silica particles are to be used as fillers in silicone rubber formulations, they become increasingly reinforcing as their sizes diminish. It is further known that the undesirable phenomenon of "crepe hardening" in filler applications can be avoided if the silica particles have been treated to make their surfaces hydrophobic. This process is often referred to as "hydrophobing" or "treating" the silica, and the organic compounds used for this process are called "hydrophobing agents".

Silica that is suitable for use as a silicone rubber filler can be prepared by hydrophobing silica from a number of sources. The most common source of silica is that obtained via neutralization of a solution of sodium silicate. Silica prepared in this manner, however, is often contaminated by a range of impurities, and it is difficult to control the physical properties of the formed particles.

Silica also may be formed by burning $SiCl_4$ in the presence of methane or hydrogen to produce $SiO_2$, $H_2O$, and HCl. Silica produced in this fashion, called pyrogenic or fumed silica, is quite pure (>99% $SiO_2$), and the particles are of suitable dimensions for use in filler applications (e.g., 2–3 $\mu$m in diameter). However, the pyrogenic process is expensive to perform, and a hydrophobing step must be executed separately to obtain treated silica.

An inexpensive alternative to pyrolysis is the hydrolysis of a halosilane in solution. However, these reactions are generally so rapid that it is difficult to control the physical properties (e.g., particle size, density, surface area) of the products.

Irrespective of its method of preparation, silica may be treated in a number of ways. For example, U.S. Pat. No. 3,122,520 discloses a general method for hydrophobing silica. In this procedure, the silica is first suspended in water to form a hydrosol. The hydrosol is then acidified, heated, and treated with an organosilicon compound to cap the surface silanol groups. The hydrophobed silica is finally partitioned into an organic solvent, which is boiled away to provide the treated product.

While this method provides treated silica particles suitable for use as silicone rubber fillers, it requires the prior formation of a silica hydrosol, which is difficult to prepare from fumed silica, and the use and subsequent removal of organic solvents.

An alternative method for preparing treated silica suitable for use as a silicone rubber filler is described in U.S. Pat. No. 4,344,800 (Lutz). This patent teaches the use of a silicon alkoxide as a starting material instead of a silica hydrosol. The silicon alkoxide is mixed with water, an alcohol, and a hydrophobing agent, aged for a period of time, and then filtered and/or oven-dried to provide the filler material. Although this method generates treated silica from a silica precursor in a single process, it employs expensive silicon alkoxides, and requires the use and subsequent removal of an organic solvent.

There exists a need for a simple method of preparing treated silica that uses inexpensive processes and starting materials, does not require the use of an organic solvent, has the flexibility to provide silica particles in a range of sizes, surface areas, densities, etc., and provides those particles in high purity. The present invention provides such a method.

BRIEF SUMMARY OF THE INVENTION

The present invention relates to a method of preparing treated silica from a silica precursor such as methyltrichlorosilane. The method comprises mixing a silica precursor with water, an acid, such as hydrochloric acid, and a hydrophobing agent such as trimethylchlorosilane. The treated silica can then be recovered from the mixture.

In particular, the present inventive method of preparing treated silica comprises:

(a) providing a mixture of:
   (i) at least one silica precursor selected from the group consisting of compounds of the formula $R_nSiX_{4-n}$, wherein each R is independently selected from the group consisting of aliphatic hydrocarbon and fluorocarbon radicals of 6 carbon atoms or less and phenyl radicals, each X is independently selected from the group consisting of halogen radicals, and n is an integer from 0 to 2, inclusive,
   (ii) water,
   (iii) an acid, and
   (iv) at least one hydrophobing agent selected from the group consisting of compounds of the formula $R_3SiX$, cyclic siloxanes of the general formula $(R_2SiO)_y$, and linear siloxanes of the general formula $R'_3Si-O-\{Si(R)_2-O\}_z-SiR'_3$, wherein each R' is independently selected from the group consisting of aliphatic hydrocarbon and fluorocarbon radicals of 6 carbon atoms or less, phenyl radicals, and hydroxyl radicals, each R is independently selected from the group consisting of aliphatic hydrocarbon and fluorocarbon radicals of 6 carbon atoms or less and phenyl radicals, each X is independently selected from the group consisting of halogen radicals, and hydroxyl radicals and salts thereof, y is 3 or 4, and z is an integer from 0 to 10, inclusive, and (b) allowing said treated silica to form in said mixture, and (c) recovering said treated silica from said mixture.

The method allows for the ready control of the rate of hydrolysis of the silica precursor, as well as the rate and extent of the polymerization and aggregation of the hydrolysis products. The method also allows for the control of the microstructure (e.g., surface area, density, particle and pore sizes, pore distribution, etc.) of the treated silica particles. The method does not require the use of an organic solvent. Furthermore, a smaller amount of hydrophobing agent may be used to achieve the same level of organic treatment as compared to conventional silica treatment processes, thereby reducing process complexity and cost. Finally, the purity of the final products can be higher than treated silica prepared from other silica precursors, such as sodium silicate.

These and other advantages of the present invention, as well as additional inventive features, will be apparent from the description of the invention provided herein.

DESCRIPTION OF THE PREFERRED EMBODIMENTS

The present invention provides a method for the direct preparation of treated silica from a silica precursor. By direct is meant that the steps of the process may be performed sequentially in a single reaction vessel, such a flask, from beginning to end without isolating or purifying any of the intermediates formed during the process. Chemists often refer to such a method as a "one-pot" process or reaction. The advantages of such a method include reduced synthesis time, complexity, effort, and cost.

According to the method of the present invention, the first step comprises the hydrolysis of a silica precursor in an acidic, aqueous solution. By a silica precursor is meant any silicon compound capable of reacting with water to provide a new silicon compound with at least one silicon-oxygen bond. In accordance with the present invention, preferred silica precursors include those of the general formula $R_nSiX_{4-n}$, wherein each R is independently selected from the group consisting of aliphatic hydrocarbon and fluorocarbon radicals of 6 carbon atoms or less (e.g., methyl, trifluoromethyl, ethyl, pentafluoroethyl, propyl, butyl, isopropyl, tert-butyl, amyl, etc.) and phenyl radicals (e.g., phenyl, tolyl, fluorophenyl, chlorophenyl, nitrophenyl, hydroxyphenyl, etc.), each X is independently selected from the group consisting of halogen radicals (e.g., chloro, bromo, iodo, etc.), and hyroxyl radicals and salts thereof (e.g., OH, O—Li, O—Na, O—K, etc.), and n is an integer from 0 to 2, inclusive. When these precursors are used to prepare treated silica according to the method of the present invention, the products are substantially free of contaminants associated with other methods of silica production.

Particularly preferred among the aforementioned silica precursors of general formula $R_nSiX_{4-n}$ are those wherein n is at least one. When the silane possesses at least one organic (R) substituent, the silica created upon hydrolysis according to the present invention also possesses at least one organic substituent, and thus requires less post-treatment as compared to conventional silica ($SiO_2$). Equivalent levels of organic functional group incorporation into the silica may therefore be obtained using smaller quantities of hydrophobing agents and shorter reaction times, making the overall method easier to perform.

Particularly preferred for use in the method of the present invention are those silica precursors of the general formula $R_nSiCl_{4-n}$, wherein R and n are as previously defined. More particularly preferred are those of general formula $RSiCl_3$, wherein R again is as previously defined. A highly preferred silica precursor for use in accordance with the method of the present invention is methyltrichlorosilane ($CH_3SiCl_3$, MTCS). MTCS is a by-product of silicone precursor production, and as such is inexpensive and readily available.

In accordance with the first step of the method, the Si—X bonds of the silica precursor, as defined above, are hydrolyzed with water to form silanol groups. For example: $CH_3SiCl_3 + 3H_2O \rightarrow CH_3Si(OH)_3 + 3HCl$. Although an acid is generated in situ during such an hydrolysis, an exogenous acid also can be utilized. Any suitable acid can be used in the reaction mixture during hydrolysis (e.g., hydrochloric acid, hydrobromic acid, hydroiodic acid, sulfuric acid, nitric acid, perchloric acid, acetic acid, trifluoroacetic acid, trichloroacetic acid, and combinations thereof).

The reaction mixture can comprise any suitable ratio of acid and water, with the proviso that there be enough water in the mixture to hydrolyze at least about 70% of the reactive Si—X bonds of the silica precursor, as defined above. Thus, for each mole of Si—X bonds, the reaction mixture should comprise at least about 0.7 moles of $H_2O$. According to a preferred embodiment of the present method, the reaction mixture comprises water mixed with an acid at the concentration limit of that acid, that is, the limit at which the acid is soluble or miscible in that quantity of water. A highly preferred reaction mixture comprises concentrated (37% by weight) hydrochloric acid.

The primary purpose of the acid in the inventive method is to help control the rate of hydrolysis of the silica precursor. The rate of hydrolysis, in turn, controls the rate of polymerization, condensation, and agglomeration of the silica, and thereby the microstructure of the formed particles (e.g., particle and pore sizes, pore distribution, surface area, etc.).

The hydrolyzed silica precursor initially contains one or more SiO—H bonds. In solution, such molecules have a tendency to condense with each other to form molecules with Si—O—Si bonds. As the condensed molecules continue to polymerize and to grow in size, particles are formed which possess an inner core of Si—O—Si bonds, and an outer shell of Si—OH bonds. These microscopic particles, which are typically less than 1 μm in diameter, have a tendency to associate with other particles to form chains, networks, gels, and other agglomerations. It is therefore important to control the rate of formation of the initial silica molecules in order to control both the microscopic and macroscopic physical properties of the silica.

The method of the present invention provides many other ways for the rate of hydrolysis of the Si—X bonds to be controlled, for instance, by regulating the temperature of the reaction. For economic reasons, it is generally preferred that the reaction be performed at ambient temperature, but heating or cooling the mixture to increase or decrease, respectively, the rate of hydrolysis and aggregation is also possible.

The concentration of the silica molecules also can be adjusted to manage the reaction rate. It is preferred that the reactions be sufficiently dilute to slow down the rate of condensation, polymerization, and aggregation of the silica molecules, but concentrated enough to avoid the use of excessive amounts of solvent. While any suitable concentration can be used, a preferred concentration range for the silica precursors is from about 0.01 M to about 10 M, a more preferred concentration range is from about 0.1 M to about 5 M, and a most preferred concentration range is from about 0.5 M to about 2 M.

The rate of hydrolysis can be increased by increasing the concentration of the reagents, i.e., by adding more silica precursor and/or water to the reaction mixture. It is preferred that such additions be performed in the vapor phase to more precisely control the rate increase.

A further method for controlling the rate of hydrolysis of a silica precursor is specific for a precursor which generates a gas upon hydrolysis (e.g., a chlorosilane). In such a case, the rate of escape of the evolved gas from the reaction can be regulated to control the reaction rate. For example, by slowing or preventing the escape of the formed gas, the reaction rate will diminish.

The hydrolysis of a chlorosilane such as $CH_3SiCl_3$ generates silica products of the general formula $CH_3Si(OH)_xO_{1.5-x/2}$, wherein x is an integer from 0 to 3, inclusive. The reaction also generates HCl, and in addition to regulating the rate of escape of this gas, as mentioned above, a highly preferred embodiment of the present invention comprises the addition of exogenous HCl to the reaction mixture to help control the rate of chlorosilane hydrolysis. In like manner, HBr or HI can be used to control the hydrolysis of bromosilanes or iodosilanes, respectively.

The hydrophobing agent also can be used to control the rate of condensation and aggregation of the silica molecules. By hydrophobing agent is meant any compound that is capable of modifying a silanol group to reduce its polarity. While any suitable hydrophobing agent can be used, preferred are compounds of the formula $R_3SiX$, cyclic siloxanes of the general formula $(R_2SiO)_y$, and linear siloxanes of the general formula $R'_3Si-O-\{Si(R)_2-O\}_z-SiR'_3$, wherein each R' is independently selected from the group consisting of aliphatic hydrocarbon and fluorocarbon radicals of 6 carbon atoms or less (e.g., methyl, trifluoromethyl, ethyl, pentafluoroethyl, propyl, butyl, isopropyl, tert-butyl, amyl, etc.), phenyl radicals (e.g., phenyl, tolyl, fluorophenyl, chlorophenyl, nitrophenyl, hydroxyphenyl, etc.), and hydroxyl radicals, each R is independently selected from the group consisting of aliphatic hydrocarbon radicals of 6 carbon atoms or less and phenyl radicals, each X is independently selected from the group consisting of halogen radicals (e.g., chloro, bromo, iodo, etc.), and hydroxyl radicals and salts thereof (e.g., OH, O—Li, O—Na, O—K, etc.), y is 3 or 4, and z is an integer from 0 to 10, inclusive. Trimethylchlorosilane (TMCS), hexamethyldisiloxane (HMDS), octamethyltrisiloxane, decamethyltetrasiloxane, hexamethylcyclotrisiloxane, hydroxy terminated polydimethylsiloxane, and octamethylcyclotetrasiloxane are highly preferred hydrophobing agents.

While any suitable amount of hydrophobing agent can be used, enough should be used to sufficiently derivitize the silica particles with organic functional groups. When a silica precursor possessing at least one organic substituent (n=1 or 2) is used in the present inventive method, less hydrophobing agent can be used to achieve the same level of organic treatment as compared to conventional silica (n=0), thereby reducing process complexity and cost. It is sometimes desirable to use a large excess of the hydrophobing agent (e.g., HMDS) in order to achieve a phase separation with the aqueous reaction mixture, and to thereby partition the treated silica particles into the organic phase comprising the hydrophobing agent. A preferred quantity of hydrophobing agent to be used according to the present inventive method is an amount that is just sufficient to cap all of the silanol groups that are available for capping. This quantity can be determined if the approximate surface area of the silica to be treated is known. It can be estimated that a maximum of about 2 silanol groups per square nanometer of surface area can be capped by the hydrophobing agent. Thus, if the surface area/gram of the silica is known, then an amount of hydrophobing agent can be added which is just sufficient to cap that number of silanol groups. Generally speaking, a preferred amount of hydrophobing agent to be used according to the method of the present invention is from about 5% to about 10% by weight of the treated silica precursor used. The hydrophobing agent can be added directly to the reaction mixture, can be mixed with water, acid, or any suitable solvent and then added to the reaction mixture, or can be added as a vapor to the reaction mixture.

For economic reasons, it is generally preferred that the hydrophobing reaction be performed at ambient temperature, but heating or cooling the mixture to increase or decrease, respectively, the rate of treatment, and/or to increase or decrease, respectively, the solubility of the treated silica particles, is also possible.

Although the silica precursor, water, acid, and hydrophobing agent can be combined in any order, it is preferred that the hydrophobing agent be added to a preformed mixture of the silica precursor, water, and acid. The timing and rate of the addition of the hydrophobing agent can be adjusted to provide treated silica particles with a range of physical properties. As the hydrophobing agent reacts with the silanol groups on the surface of the growing silica particles, the silanol groups become capped, and therefore the particles become less polar, and less disposed to condense, polymerize, or aggregate. For example, TMCS reacts with $CH_3Si(OH)_3$ according to the following equation: $CH_3Si(OH)_3 + 3(CH_3)_3Si-Cl \rightarrow CH_3Si(O-Si(CH_3)_3)_3 + 3HCl$. If the hydrophobing agent is added to the reaction mixture soon after the silica precursor, acid, and water have been combined, treated silica particles of relatively small dimensions (e.g., less than about 10 $\mu$m in diameter) can be obtained, which are suitable for use as fillers in silicone rubber applications. The average silica matrix produced in this manner preferably comprises at least one hundred silica atoms.

The treated silica is recovered from the reaction mixture. Any suitable technique can be used to effect such recovery. According to a preferred embodiment of the present inventive method, the hydrophobing reaction is performed directly in the same reaction mixture (preferably acidic $H_2O$) used for the hydrolysis of the silica precursor. No organic solvent is required, which obviates any need for its subsequent recovery and disposal, making the method simple and efficient. In these embodiments, the treated silica particles will often precipitate from the solution, allowing for their easy recovery (e.g., by filtration).

Although an organic solvent is not required in the present inventive method, one can be used if desired. For example, in some cases it may be desirable to add a cosolvent, such as an alcohol, to the reaction mixture. One may also wish to partition the treated silica into a suitable organic solvent, instead of recovering the treated silica directly from the aqueous reaction mixture.

Whether obtained directly or indirectly, the treated silica particles made in accordance with the method of the present invention will typically be dried after recovery (e.g., isolation) to remove residual solvents. Any suitable drying technique can be utilized, for example, placing the treated silica into an oven.

The method of the present invention can be used to create hydrophobic silica powders with a variety of physical properties. For example, treated silica can be prepared with a tap density of less than about 0.05 to more than about 1 g/cm$^3$, a surface area of less than about 1 to more than about 800 m$^2$/g, and a C value of less than about 5 to more than about 70. These treated silica particles will be useful in a wide range of applications, including as fluid thickeners, thermal insulation, anti-caking agents, molecular sieve materials, and reinforcing fillers for silicone and rubber.

EXAMPLES

The preparation of treated silica using the method of the present invention can best be understood by reference to the following examples, each of which illustrates an embodiment of the present invention. While these examples further illustrate the present invention, of course, they should not be construed as in any way limiting its scope. In the context of the following examples tap density, BET surface area, and BET C value are measured as follows.

Measurement of Tap Density: A known mass of the dry powder was transferred to a 10 cm$^3$ graduated cylinder and tapped 40 times by hand. The volume was then noted, and the density calculated as mass/volume.

Measurement of Surface Area and C Value: The nitrogen adsorption data was obtained using ASAP2000, an automated volumetric gas sorption system made by Micromeritics Corp. (Atlanta, Ga.). Prior to performing the adsorption experiment, the samples were outgassed at 180° C. to less than 0.003 mm Hg, which typically took less than 4 hours. For the adsorption experiment, the amount of nitrogen adsorbed at five different relative pressures over the range 0.05 to 0.25 were obtained and analyzed using the Brunauer-Emmett-Teller (BET) model (Gregg et al, "Adsorption, Surface Area and Porosity," p. 285, Academic Press, New York (1991)). The BET model provided the surface area and C value for the powders. A lower C value is indicative of a greater number of hydrophobic groups on the silica.

Example 1

To a stirred solution of concentrated hydrochloric acid (100 ml) was added methyltrichlorosilane (5 ml) at a rate of about 0.6 ml/min. Stirring was continued for one minute, and then trimethylchlorosilane (2 ml) was added at a rate of about 1.3 ml/min. Over the course of 10 minutes, a white precipitate comprising treated silica formed. The precipitate was collected via vacuum filtration, washed with water (100 ml), and dried in a convection oven at 150° C. for 90 minutes. The tap density, C value and surface area of the dried, treated, silica powder were measured. The dried precipitate had a tap density of 0.112 g/ml, a surface area of 27 m$^2$/g, and a C value of 37.

Example 2

This example illustrates four embodiments of the present invention in which methyltrichlorosilane, hydrochloric acid and trimethylchlorosilane were mixed to provide a silica. These embodiments show that silicas with a variety of properties can be obtained by reacting these three reagents.

(A) 6.7 ml methyltrichlorosilane was added to 17 ml concentrated hydrochloric acid and stirred for 5 minutes. Then 1.7 ml trimethylchlorosilane was added to this mixture and further stirred for 10 minutes. Drying this mixture in a 150° C. exhaust oven resulted in a powder with a tap density of 0.16 g/cc, BET surface area of 12 m$^2$/g, and a BET C value of 23.

(B) 7.7 ml methyltrichlorosilane was added to 15 ml concentrated hydrochloric acid and stirred for 5 minutes. Then 1.9 ml trimethylchlorosilane was added to this mixture and further stirred for 10 minutes. Drying this mixture in a 150° C. exhaust oven resulted in a powder with a tap density of 0.20 g/ml, BET surface area of 9 m$^2$/g, and a BET value of 40.

(C) 2.2 ml methyltrichlorosilane was added to 22 ml concentrated hydrochloric acid and stirred for 5 minutes. Then 0.7 ml trimethylchlorosilane was added to this mixture and further stirred for 10 minutes. Drying this mixture in a 150° C. exhaust oven resulted in a powder with a tap density of 0.21 g/ml, BET surface area of 1 m$^2$/g, and a BET C value of 14.

(D) 2.2 ml methyltrichlorosilane was added to 22 ml concentrated hydrochloric acid and stirred for 20 minutes. Then 0.7 ml trimethylchlorosilane was added to this mixture and further stirred for 10 minutes. Drying this mixture in a 150° C. exhaust oven resulted in a powder with a tap density of 0.11 g/ml, BET surface area of 9 m$^2$/g, and a BET C value of 21.

Example 3

1.2 ml trimethylchlorosilane was added dropwise to 5.9 ml methyltrichlorosilane and being stirred. After 5 minutes this mixture was added to 18 ml concentrated hydrochloric acid while being stirred. A waxy clump resulted. Drying this in a 150° C. exhaust oven resulted in a powder with a tap density of 0.28 g/ml.

Example 4

12 ml concentrated hydrochloric acid was added dropwise to 5.9 ml deionized water while being stirred. To this mixture 5.9 ml methyltrichlorosilane was added and stirred for 5 minutes. Then 1.2 ml trimethylchlorosilane was added to this mixture and further stirred for 10 minutes. Drying this mixture in a 150° C. exhaust oven resulted in a powder with a tap density of 0.16 g/ml, BET surface area of 7 m$^2$/g, and a BET C value of 26.

Example 5

3.1 ml methyltrichlorosilane and 6.2 ml hexamethyldisiloxane were mixed and stirred for 5 minutes. This mixture was then added to 15.6 ml concentrated hydrochloric acid (12.2 M HCl) and further stirred for 10 minutes. A gelatinous residue resulted.

Example 6

5 ml methyltrichlorosilane was added at a flow rate of 0.8 ml/min to 50 ml concentrated hydrochloric acid and stirred for 5 minutes. Drying this mixture in a 150° C. exhaust oven resulted in a powder with a tap density of 0.13 g/ml.

Example 7

4.2 ml methyltrichlorosilane was added dropwise to 20.8 ml deionized water and stirred for 10 minutes. A hard sticky precipitate resulted.

Example 8

3.1 ml methyltrichlorosilane and 6.2 ml HMDS were mixed and stirred for 5 minutes. This mixture was then added to 15.6 ml deionized water and further stirred for 10 minutes. A cloudy liquid with a waxy residue resulted.

Example 9

10.9 ml methyltrichlorosilane and 10.9 ml trimethylchlorosilane were mixed and stirred for 5 minutes. Then 3.3 ml deionized water was added to this mixture and further stirred for 10 minutes. A gelatinous residue resulted.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A method of preparing treated silica comprising:
(a) providing a mixture comprising:
(i) at least one silica precursor selected from the group consisting of compounds of the formula $R_nSiX_{4-n}$, wherein each R is independently selected from the group consisting of aliphatic hydrocarbon and fluorocarbon radicals of 6 carbon atoms or less and phenyl radicals, each X is independently selected from the group consisting of halogen radicals, and n is an integer from 0 to 2, inclusive,
(ii) water,
(iii) an acid, and
(iv) at least one hydrophobing agent selected from the group consisting of compounds of the formula $R_3SiX$, cyclic siloxanes of the general formula $(R_2SiO)_y$, and linear siloxanes of the general formula $R'_3Si—O—\{Si(R)_2—O\}_z—SiR'_3$, wherein each R' is independently selected from the group consisting of aliphatic hydrocarbon and fluorocarbon radicals of 6 carbon atoms or less, phenyl radicals, and hydroxyl radicals, each R is independently selected from the group consisting of aliphatic hydrocarbon and fluorocarbon radicals of 6 carbon atoms or less and phenyl radicals, each X is independently selected from the group consisting of halogen radicals, and hydroxyl radicals and salts thereof, y is 3 or 4, and z is an integer from 0 to 10, inclusive, wherein substantially the only silica present in said mixture is that generated in situ, and
(b) allowing said treated silica to form in said mixture, and
(c) recovering said treated silica from said mixture.

2. A method of preparing treated silica comprising:
(a) providing a mixture comprising:
(i) at least one silica precursor selected from the group consisting of compounds of the formula $R_nSiX_{4-n}$, wherein each R is independently selected from the group consisting of aliphatic hydrocarbon and fluorocarbon radicals of 6 carbon atoms or less and phenyl radicals, each X is independently selected from the group consisting of halogen radicals, and n is an integer from 0 to 2, inclusive,
(ii) water,
(iii) an exogenous acid, and
(iv) at least one hydrophobing agent selected from the group consisting of compounds of the formula $R_3SiX$, cyclic siloxanes of the general formula $(R_2SiO)_y$, and linear siloxanes of the general formula $R'_3Si—O—\{Si(R)_2—O\}_z—SiR'_3$, wherein each R' is independently selected from the group consisting of aliphatic hydrocarbon and fluorocarbon radicals of 6 carbon atoms or less, phenyl radicals, and hydroxyl radicals, each R is independently selected from the group consisting of aliphatic hydrocarbon and fluorocarbon radicals of 6 carbon atoms or less and phenyl radicals, each X is independently selected from the group consisting of halogen radicals, and hydroxyl radicals and salts thereof, y is 3 or 4, and z is an integer from 0 to 10, inclusive, wherein substantially the only silica present in said mixture is that generated in situ, and
(b) allowing said treated silica to form in said mixture, and
(c) recovering said treated silica from said mixture.

3. The method of claim 1, wherein said acid is selected from the group consisting of hydrochloric acid, hydrobromic acid, hydroiodic acid, sulfuric acid, nitric acid, perchloric acid, acetic acid, trifluoroacetic acid, trichloroacetic acid, and combinations thereof.

4. The method of claim 3, wherein said acid is hydrochloric acid.

5. The method of claim 4, wherein said water and said acid comprises concentrated hydrochloric acid.

6. The method of claim 1, wherein said hydrophobing agent is selected from the group consisting of trimethylchlorosilane, hexamethyldisiloxane, octamethyltrisiloxane, decamethyltetrasiloxane, hexamethylcyclotrisiloxane, octamethylcyclotetrasiloxane, and hydroxy terminated polydimethylsiloxane.

7. The method of claim 1, wherein said silica precursor, said water, and said acid are combined prior to adding said hydrophobing agent.

8. The method of claim 1, wherein said acid is generated in situ in said mixture.

9. The method of claim 1, wherein the pH of said mixture is less than about 1.

10. The method of claim 1, wherein said method does not comprise the addition of an organic cosolvent.

11. The method of claim 1, wherein said treated silica is allowed to form at ambient temperature.

12. A method of preparing treated silica comprising:
(a) providing a mixture comprising:
(i) at least one silica precursor selected from the group consisting of compounds of the formula $R_nSiX_{4-n}$, wherein each R is independently selected from the group consisting of aliphatic hydrocarbon and fluorocarbon radicals of 6 carbon atoms or less and phenyl radicals, each X is independently selected from the group consisting of halogen radicals, and n is an integer from 0 to 2, inclusive,
(ii) water,
(iii) an exogenous acid, and
(iv) at least one hydrophobing agent selected from the group consisting of compounds of the formula $R_3SiX$, cyclic siloxanes of the general formula $(R_2SiO)_y$, and linear siloxanes of the general formula $R'_3Si—O—\{Si(R)_2—O\}_z—SiR'_3$, wherein each R' is independently selected from the group consisting of aliphatic hydrocarbon and fluorocarbon radicals of 6 carbon atoms or less, phenyl radicals, and hydroxyl radicals, each R is independently selected from the group consisting of aliphatic hydrocarbon and fluorocarbon radicals of 6 carbon atoms or less and phenyl radicals, each X is independently selected from the group consisting of halogen radicals, and hydroxyl radicals and salts thereof, y is 3 or 4, and z is an integer from 0 to 10, inclusive, and
(b) allowing said treated silica to form in said mixture, and
(c) recovering said treated silica from said mixture.

13. The method of claim 12, wherein said silica precursor is methyltrichlorosilane.

14. The method of claim 12, wherein said acid is selected from the group consisting of hydrochloric acid, hydrobromic acid, hydroiodic acid, sulfuric acid, nitric acid, perchloric acid, acetic acid, trifluoroacetic acid, trichloroacetic acid, and combinations thereof.

15. The method of claim 14, wherein said acid is hydrochloric acid.

16. The method of claim 15, wherein said water and said acid comprises concentrated hydrochloric acid.

17. The method of claim 12, wherein said hydrophobing agent is selected from the group consisting of trimethylchlorosilane, hexamethyldisiloxane, octamethyltrisiloxane, decamethyltetrasiloxane, hexamethylcyclotrisiloxane, octamethylcyclotetrasiloxane, and hydroxy terminated polydimethylsiloxane.

18. The method of claim 12, wherein said silica precursor, said water, and said acid are combined prior to adding said hydrophobing agent.

19. The method of claim 12, wherein the pH of said mixture is less than about 1.

20. The method of claim 12, wherein said method does not comprise the addition of an organic cosolvent.

21. The method of claim 12, wherein said treated silica is allowed to form at ambient temperature.

* * * * *